(12) United States Patent
Sekiguchi et al.

(10) Patent No.: US 8,659,718 B2
(45) Date of Patent: Feb. 25, 2014

(54) LIQUID CRYSTAL DISPLAY DEVICE

(75) Inventors: Yoshifumi Sekiguchi, Ibaraki (JP);
Naoki Sato, Chiba (JP); Naoki Iwasaki, Chiba (JP); Takaaki Kitada, Chiba (JP)

(73) Assignee: Panasonic Liquid Crystal Display Co., Ltd., Osaka (JP)

( * ) Notice: Subject to any disclaimer, the term of this patent is extended or adjusted under 35 U.S.C. 154(b) by 173 days.

(21) Appl. No.: 13/333,442

(22) Filed: Dec. 21, 2011

(65) Prior Publication Data
US 2012/0162569 A1 Jun. 28, 2012

(30) Foreign Application Priority Data
Dec. 24, 2010 (JP) ................................. 2010-287202

(51) Int. Cl.
*G02F 1/1333* (2006.01)
(52) U.S. Cl.
USPC .......................................................... 349/58
(58) Field of Classification Search
USPC .......................................................... 349/58
See application file for complete search history.

(56) References Cited

U.S. PATENT DOCUMENTS

| 8,233,128 B2 * | 7/2012 | Kim | 349/152 |
| 8,421,946 B2 * | 4/2013 | Kim | 349/58 |
| 2007/0165419 A1 | 7/2007 | Horiuchi et al. | |
| 2010/0066937 A1 | 3/2010 | Yamashita et al. | |
| 2013/0107157 A1 * | 5/2013 | Yang et al. | 349/58 |
| 2013/0155346 A1 * | 6/2013 | Li | 349/58 |
| 2013/0208208 A1 * | 8/2013 | Li | 349/58 |
| 2013/0242225 A1 * | 9/2013 | Yu | 349/58 |

FOREIGN PATENT DOCUMENTS

| JP | 2005-243522 | 9/2005 |
| JP | 2009-301912 | 12/2009 |
| JP | 2010-072262 | 4/2010 |

* cited by examiner

*Primary Examiner* — Timothy L Rude
(74) *Attorney, Agent, or Firm* — Hamre, Schumann, Mueller & Larson, P.C.

(57) ABSTRACT

Provided is a liquid crystal display device (1) with increased light use efficiency and thin frame on the side on which the light emitting diode is disposed, including: a liquid crystal panel (3); a backlight unit (5) including a light guide plate (12) and light emitting diodes being disposed side by side in a longitudinal direction of an incident surface; an intermediate frame (9), which includes a plurality of protruding portions that protrude to an exiting surface side of the light guide plate (12); and an end portion reflection sheet (14), which is disposed on an exiting surface side of the intermediate frame (9) and adjacent to the plurality of protruding portions, extends in an array direction of the light emitting diodes, and includes tongue-shaped portions each extending between adjacent ones of the plurality of protruding portions.

5 Claims, 10 Drawing Sheets

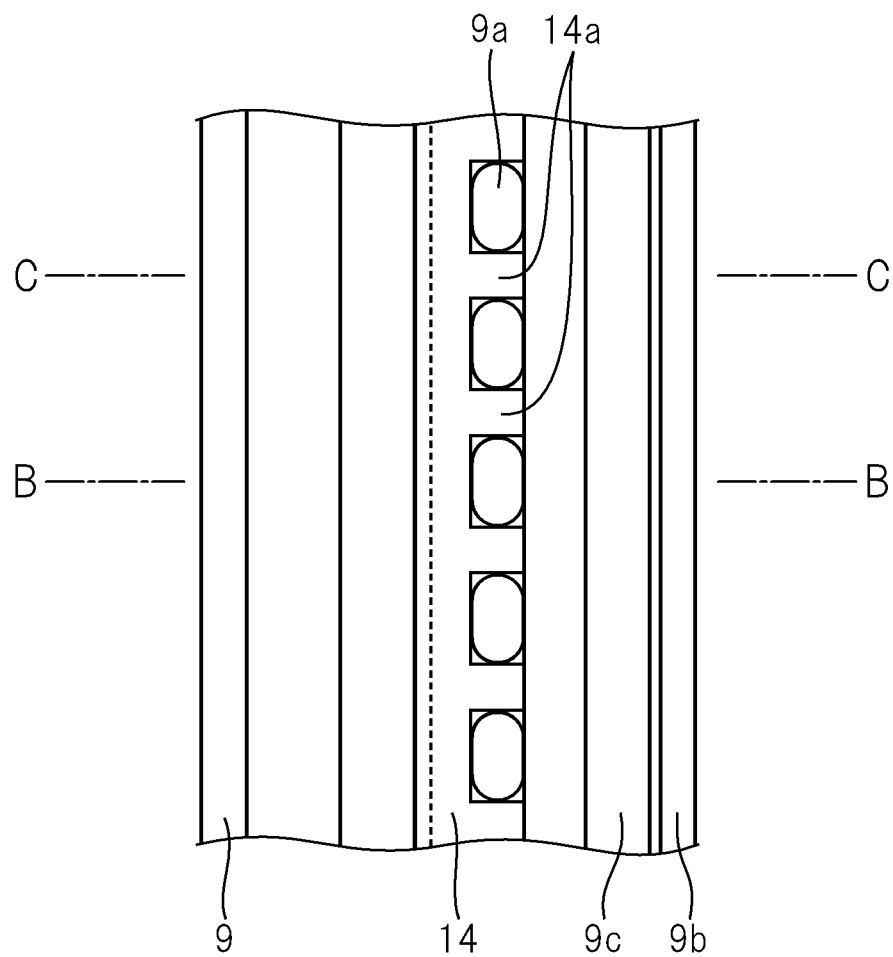

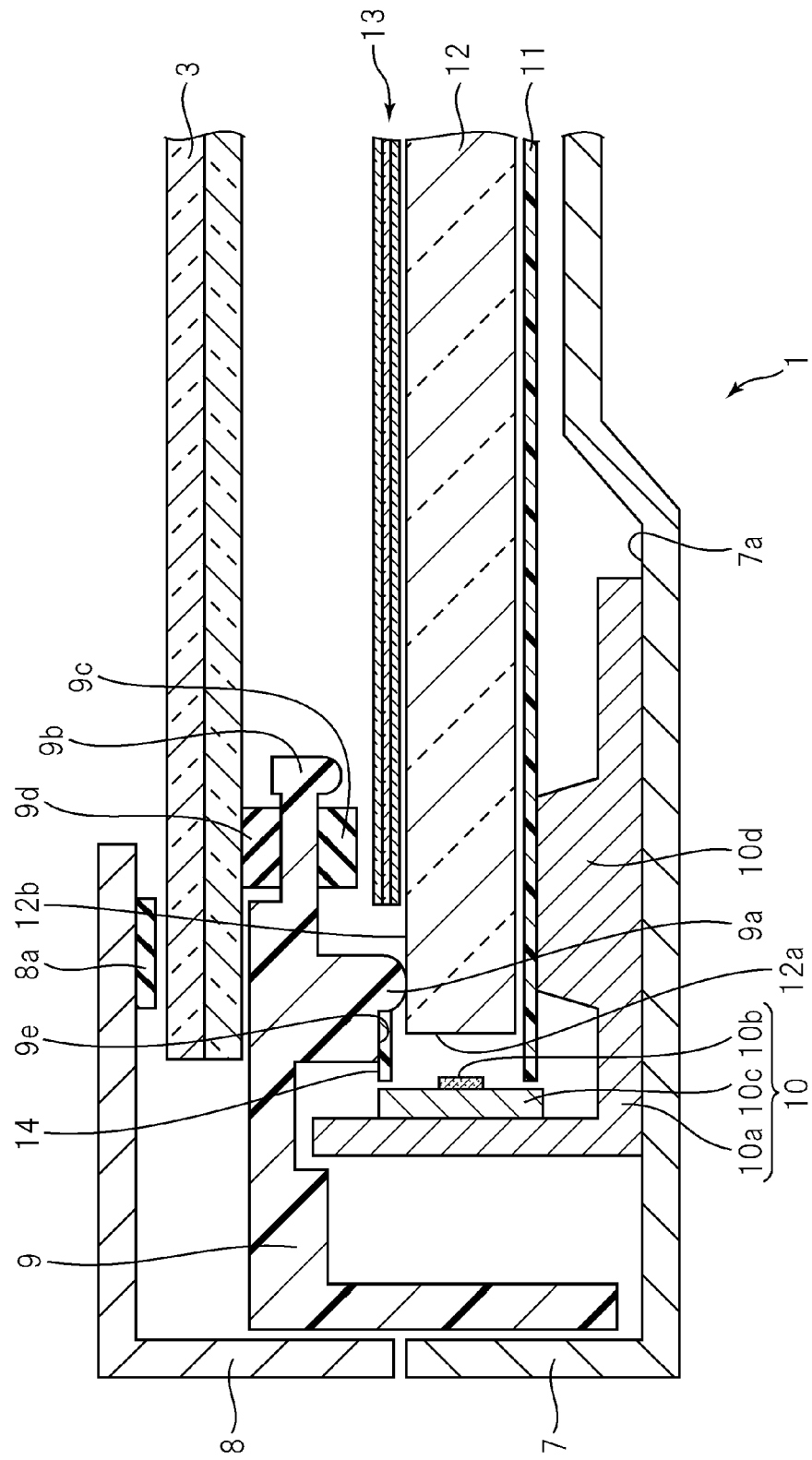

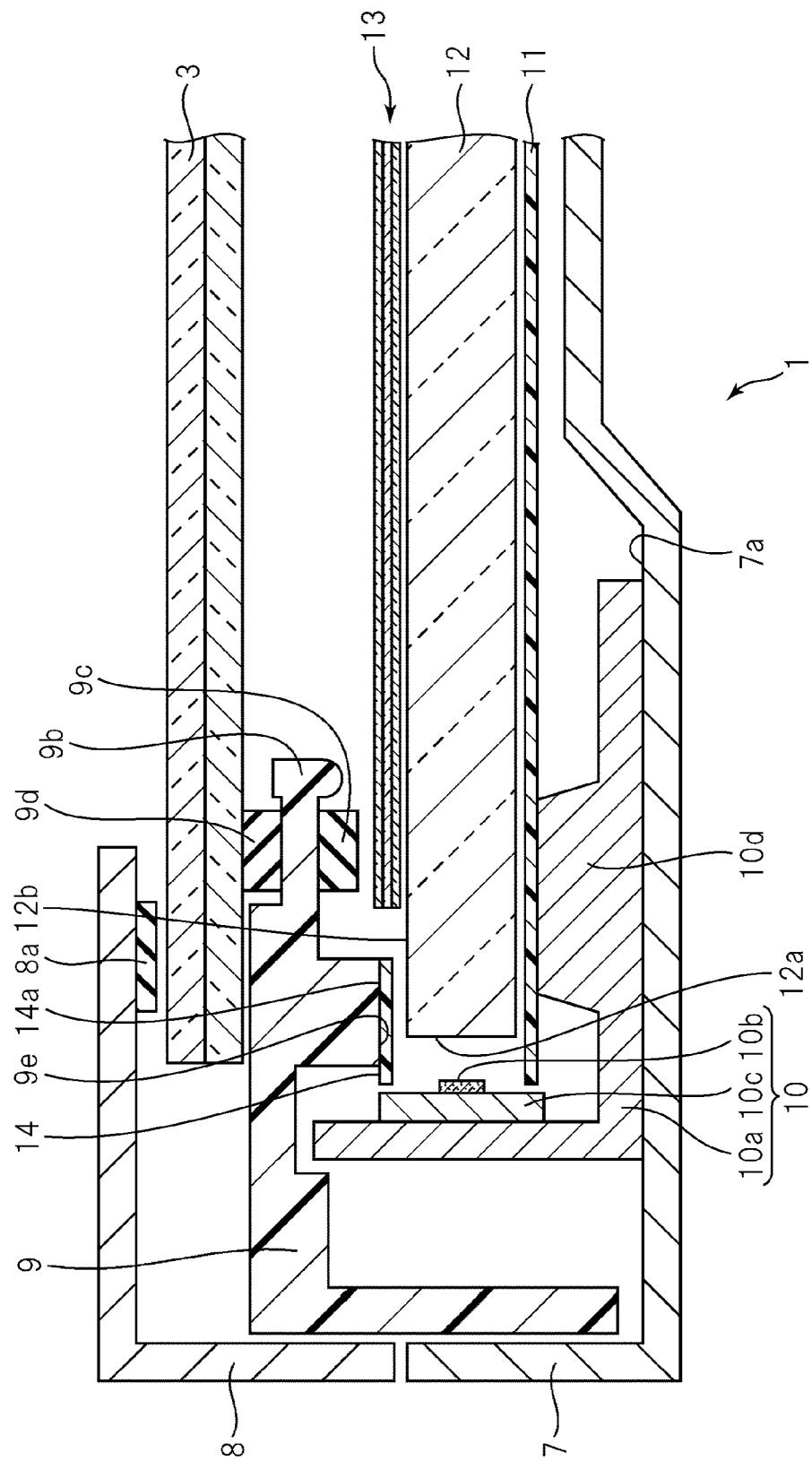

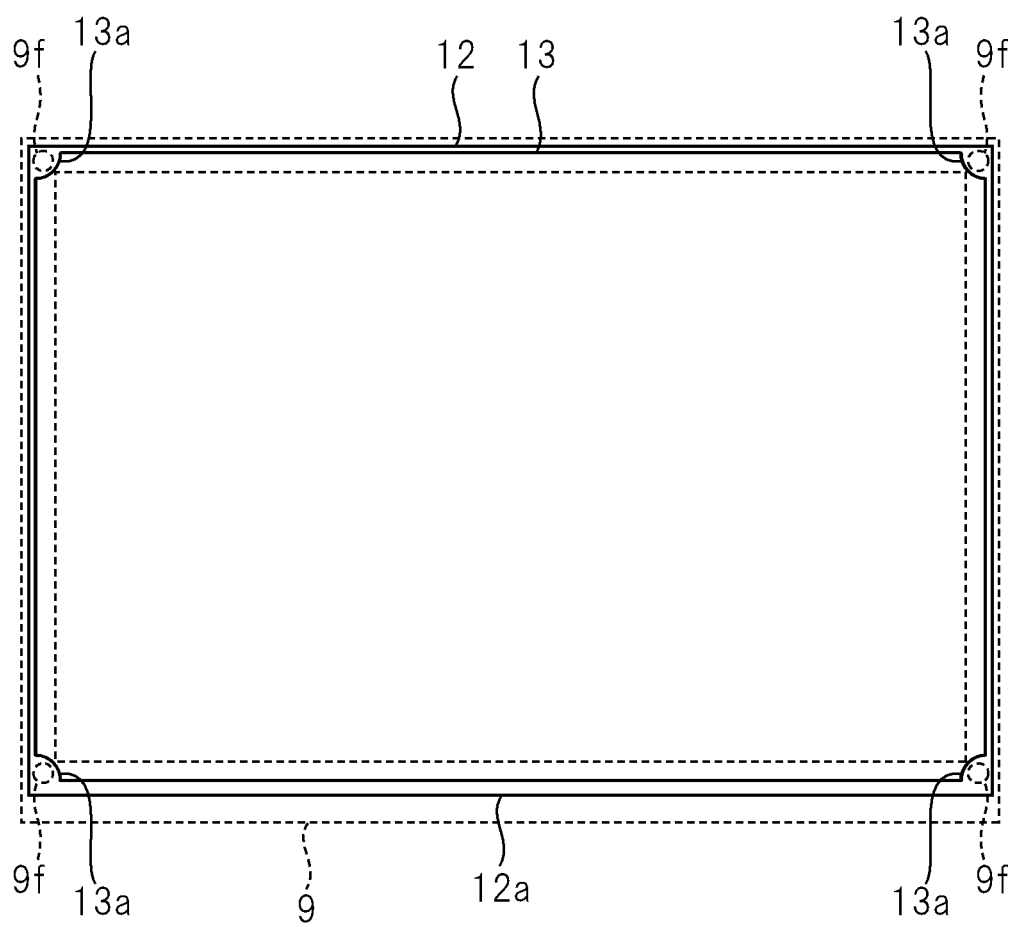

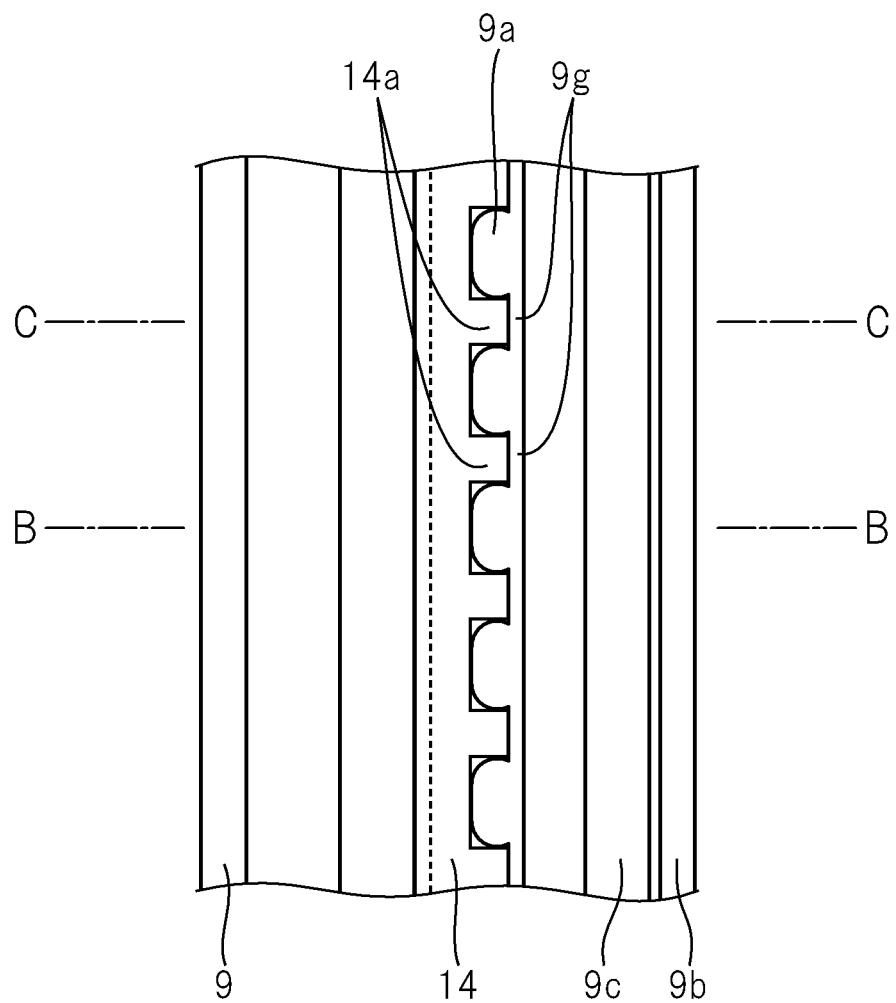

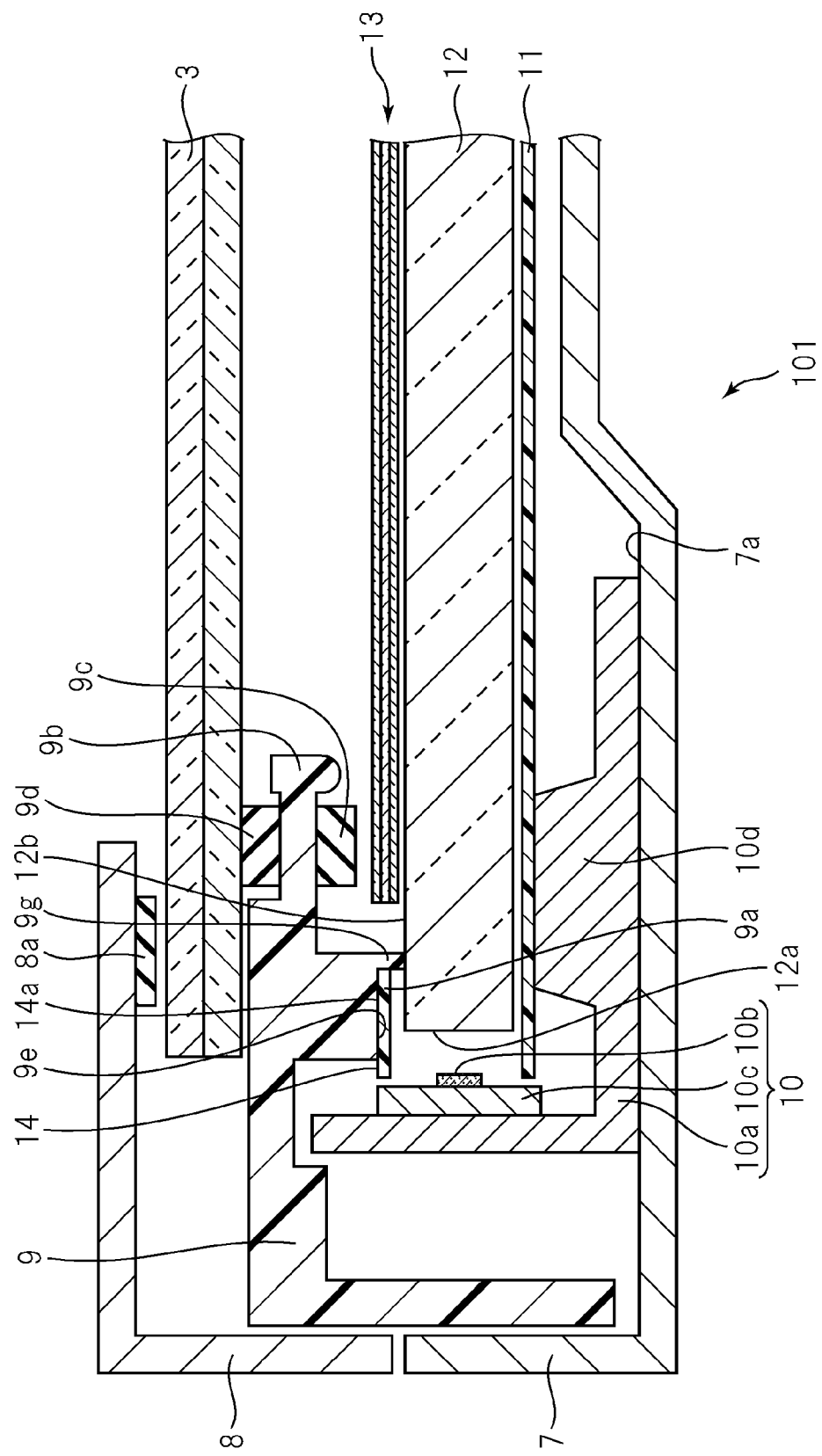

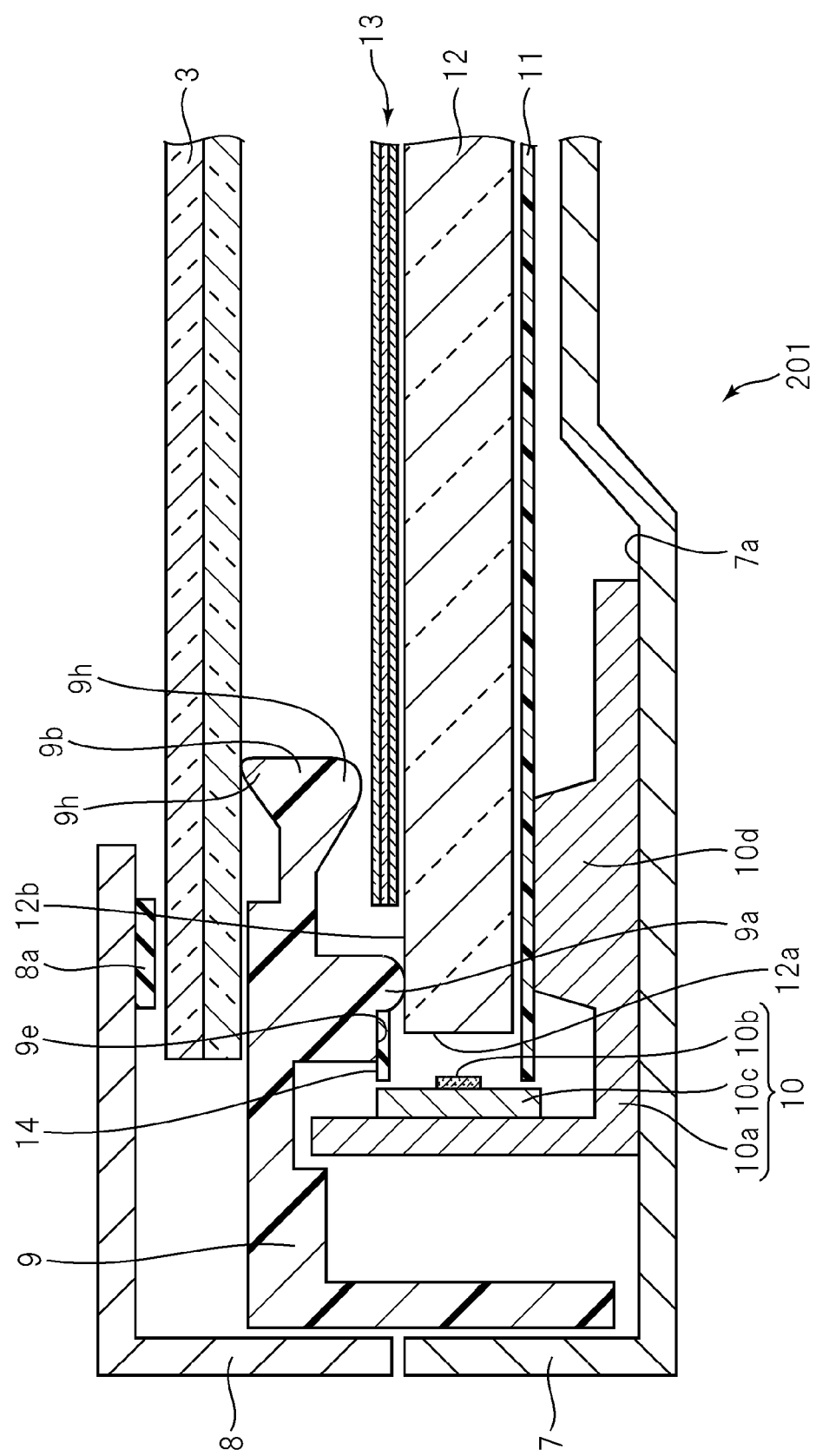

LIQUID CRYSTAL DISPLAY DEVICE

CROSS-REFERENCE TO RELATED APPLICATION

The present application claims priority from Japanese application JP 2010-287202 filed on Dec. 24, 2010, the content of which is hereby incorporated by reference into this application.

BACKGROUND OF THE INVENTION

1. Field of the Invention

The present invention relates to a liquid crystal display device.

2. Description of the Related Art

JP 2009-301912 A describes a liquid crystal display device including a backlight unit that allows light beams from a light emitting diode light source to enter through the side surface of a light guide plate and performs optical path conversion to emit planar illumination light to a liquid crystal display panel. JP 2009-301912 A illustrates the structure in which a reflection sheet is disposed over the rear surface of the light guide plate including the light emitting diode light source, and a rim sheet having functions of light shielding and reflection is provided just above the light emitting diode light source through the intermediation of an optical sheet such as a prism sheet (FIG. 3).

In the structure of the backlight unit described in JP 2009-301912 A, part of the light emitted from the light emitting diode light source propagates through the optical sheet rather than the light guide plate, and hence light beams leak out to cause brightness unevenness or lower light use efficiency. To address the problem, it is conceivable that a sheet having a reflection function is adhered directly onto the top surface of an end portion of the light guide plate without the intermediation of an optical sheet, so as to be positioned just above the light emitting diode light source.

However, simply adhering the sheet having the reflection function onto the top surface of the end portion of the light guide plate requires a large margin to adhere. Accordingly, the liquid crystal display device needs a thick frame on the side on which the light emitting diode light source is disposed.

SUMMARY OF THE INVENTION

The present invention has been made in view of the above-mentioned viewpoint, and has an object of preventing light leakage from a light emitting diode to increase light use efficiency in a liquid crystal display device and thinning a frame of the liquid crystal display device even on the side on which the light emitting diode is disposed.

Representative aspects of the invention disclosed herein are briefly outlined as follows.

(1) There is provided a liquid crystal display device, including: a liquid crystal panel; a backlight unit including a light guide plate and light emitting diodes, the light emitting diodes being opposed to an incident surface of the light guide plate, which is at least one side surface of the light guide plate, and being disposed side by side in a longitudinal direction of the incident surface; an intermediate frame, which includes a plurality of protruding portions that protrude to an exiting surface side of the light guide plate, and is disposed between the liquid crystal panel and the backlight unit; and an end portion reflection sheet, which is disposed on an exiting surface side of the intermediate frame and adjacent to the plurality of protruding portions, extends in an array direction of the light emitting diodes, and includes tongue-shaped portions each extending between adjacent ones of the plurality of protruding portions.

(2) In the liquid crystal display device according to the above-mentioned item (1), the plurality of protruding portions are arrayed intermittently along the array direction of the light emitting diodes, and are provided on a light incident direction side of the incident surface with respect to the incident surface of the light guide plate.

(3) The liquid crystal display device according to the above-mentioned item (1) or (2) further includes shielding portions for shielding light, each of which is disposed between the adjacent ones of the plurality of protruding portions in a region on a light incident direction side of the incident surface.

(4) In the liquid crystal display device according to any one of the above-mentioned items (1) to (3), the intermediate frame further includes second protruding portions, which are adapted to contact the light guide plate at positions corresponding to four corners of the light guide plate, the second protruding portions being larger in size than the plurality of protruding portions.

(5) In the liquid crystal display device according to any one of the above-mentioned items (1) to (4), the end portion reflection sheet further includes a portion extending out of the intermediate frame in a direction opposite to a light incident direction of the incident surface.

According to the above-mentioned invention disclosed herein, it is possible to prevent light leakage from the light emitting diode to increase light use efficiency in the liquid crystal display device and thin the frame of the liquid crystal display device even on the side on which the light emitting diode is disposed.

BRIEF DESCRIPTION OF THE DRAWINGS

In the accompanying drawings:

FIG. 4 is a partial enlarged view illustrating an intermediate frame and an end portion reflection sheet adhered to the intermediate frame as viewed from the direction A illustrated in FIG. 3;

FIG. 5 is a cross-sectional view of the liquid crystal display device taken along the line B-B of FIG. 4;

FIG. 6 is a cross-sectional view of the liquid crystal display device taken along the line C-C of FIG. 4;

FIG. 7 is a view illustrating a positional relation among the intermediate frame, a light guide plate, and an optical sheet of the liquid crystal display device in plan view;

FIG. 8 is a partial enlarged view illustrating an intermediate frame and an end portion reflection sheet adhered to the intermediate frame as viewed from the direction A illustrated in FIG. 3 in a liquid crystal display device according to a second embodiment of the present invention;

FIG. 9 is a cross-sectional view of the liquid crystal display device taken along the line C-C of FIG. 8; and FIG. 10 is a cross-sectional view of a liquid crystal display device according to a third embodiment of the present invention taken along the line B-B of FIG. 4.

DETAILED DESCRIPTION OF THE INVENTION

Hereinafter, referring to FIGS. 1 to 7, a first embodiment of the present invention is described.

Figure 1:
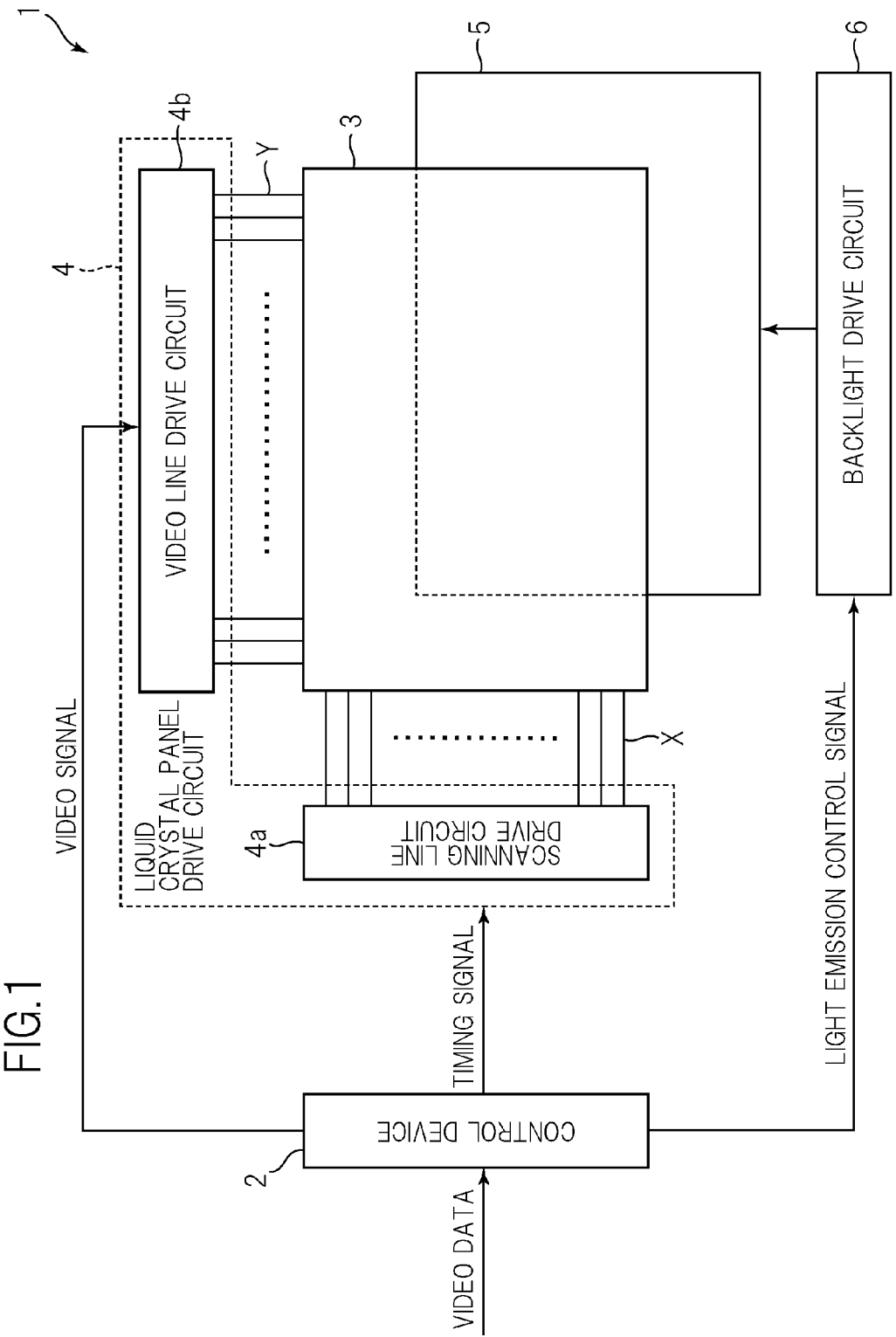
FIG. 1 is a diagram illustrating a configuration of a liquid crystal display device according to a first embodiment of the present invention.

FIG. 1 is a diagram illustrating a configuration of a liquid crystal display device 1 according to the first embodiment of the present invention. As illustrated in FIG. 1, the liquid crystal display device 1 includes a control device 2, a liquid crystal panel 3, and a liquid crystal panel drive circuit 4. The liquid crystal panel drive circuit 4 includes a scanning line drive circuit 4a and a video line drive circuit 4b. Further, the liquid crystal display device 1 includes a backlight unit 5 and a backlight drive circuit 6.

The liquid crystal panel 3 has a rectangular shape, the lengths of which in the lateral direction and the vertical direction are determined depending on the intended use of the liquid crystal display device 1. The liquid crystal panel may have a vertically-elongated shape (the length in the lateral direction is shorter than the length in the vertical direction) or a horizontally-elongated shape (the length in the lateral direction is longer than the length in the vertical direction). Alternatively, the lengths in the lateral direction and the vertical direction may be equal to each other. In this embodiment, the liquid crystal display device 1 is assumed to be used for a television set, and hence the liquid crystal panel 3 has a horizontally-elongated shape.

The liquid crystal panel 3 includes a pair of transparent substrates. On a TFT substrate as one of the transparent substrates, a plurality of video signal lines Y and a plurality of scanning signal lines X are formed. The video signal lines Y and the scanning signal lines X are provided orthogonal to each other to form a grid pattern. A region surrounded by adjacent two video signal lines Y and adjacent two scanning signal lines X corresponds to one pixel.

Figure 2:
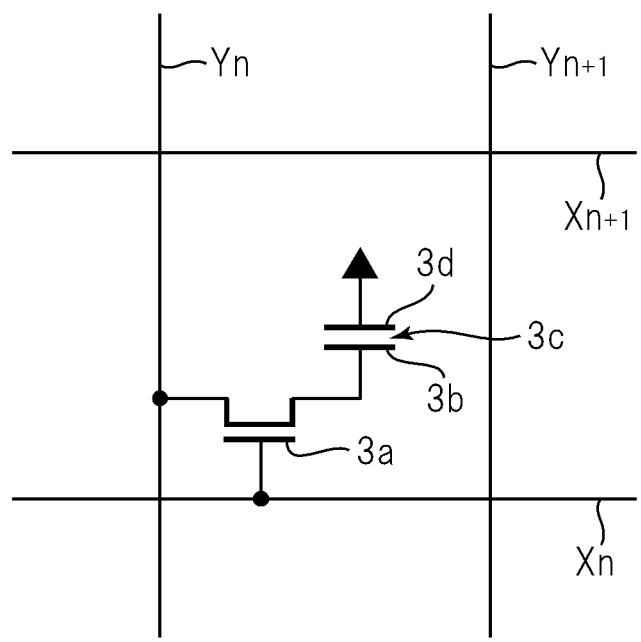
FIG. 2 illustrates a circuit diagram of one pixel formed in a liquid crystal panel.

FIG. 2 illustrates a circuit diagram of one pixel formed in the liquid crystal panel 3. In FIG. 2, a region surrounded by video signal lines Yn and Yn+1 and scanning signal lines Xn and Xn+1 corresponds to one pixel. The pixel focused here is driven by the video signal line Yn and the scanning signal line Xn. On the TFT substrate side of each of the pixels, a thin film transistor (TFT) 3a is provided. The TFT 3a is turned ON by a scanning signal input from the scanning signal line Xn. The video signal line Yn applies a voltage (signal representing a gradation value for each pixel) to a pixel electrode 3b of the pixel via the ON-state TFT 3a.

On the other hand, a color filter is formed on a color filter substrate as the other of the transparent substrates and a liquid crystal 3c is sealed between the TFT substrate and the color filter substrate. Then, a common electrode 3d is formed so as to form a capacitance with the pixel electrode 3b via the liquid crystal 3c. The common electrode 3d is electrically connected to a common potential. Accordingly, depending on the voltage applied to the pixel electrode 3b, an electric field between the pixel electrode 3b and the common electrode 3d changes, thereby changing the orientation state of the liquid crystal 3c to control the polarization state of light beams passing through the liquid crystal panel 3. Polarization filters are respectively adhered to a display surface of the liquid crystal panel 3 and a rear surface thereof, which is the opposite surface of the display surface. With this, the liquid crystal panel 3 functions as a light shutter that controls, for each pixel, the transmission amount of a light beam passing through the each pixel.

Note that, the common electrode 3d may be provided in either the TFT substrate or the color filter substrate. How to dispose the common electrode 3d depends on the liquid crystal driving mode. For example, in an in-plane switching (IPS) mode, the common electrode 3d is provided on the TFT substrate. In a vertical alignment (VA) mode or a twisted nematic (TN) mode, the common electrode is provided on the color filter substrate. This embodiment uses the IPS mode, where the common electrode 3d is provided on the TFT substrate. Further, the transparent substrates of this embodiment are formed of glass, but other materials such as a resin may be used.

Into the control device 2, video data received by a tuner or an antenna (not shown) or video data generated in a different device such as a video reproducing device is input. The control device 2 may be a microcomputer including a central processing unit (CPU) and a memory such as a read only memory (ROM) and a random access memory (RAM). The control device 2 performs various types of image processing, such as color adjustment, with respect to the input video data, and generates a video signal representing a gradation value for each of the pixels. The control device 2 outputs the generated video signal to the video line drive circuit 4b. Further, the control device 2 generates, based on the input video data, a timing signal for synchronizing the video line drive circuit 4b, the scanning line drive circuit 4a, and the backlight drive circuit 6, and outputs the generated timing signal to the respective drive circuits. Note that, the present invention is not intended to limit the form of the control device 2 particularly. For example, the control device 2 may be constituted by a plurality of LSIs or a single LSI. Further, the control device 2 may not be configured to synchronize between the backlight drive circuit 6 and the other circuits.

As described later, this embodiment uses a plurality of light emitting diodes as light sources of the backlight unit 5, and the backlight drive circuit 6 is a circuit for supplying a current necessary for the plurality of light emitting diodes. In this embodiment, the control device 2 generates a signal for controlling brightness of the light emitting diode based on input video data, and outputs the generated signal toward the backlight drive circuit 6. Then, in accordance with the generated signal, the backlight drive circuit 6 controls an amount of current flowing through the light emitting diode and adjust the brightness of the light emitting diode. Note that, the backlight drive circuit 6 may supply a constant current to the light emitting diode all the time.

The scanning line drive circuit 4a is connected to the scanning signal lines X formed on the TFT substrate. The scanning line drive circuit 4a selects one of the scanning signal lines X in order in response to the timing signal input from the control device 2, and the selected scanning signal line X is applied with a voltage. When the voltage is applied to the scanning signal line X, the TFTs connected to the scanning signal line X are turned ON.

The video line drive circuit 4b is connected to the video signal lines Y formed on the TFT substrate. In conformity to the selection of the scanning signal line X by the scanning line drive circuit 4a, the video line drive circuit 4b applies, to each of the TFTs provided to the selected scanning signal line X, a voltage corresponding to the video signal representing the gradation value of each of the pixels.

The backlight unit 5 is provided on the rear surface side of the liquid crystal panel 3. The backlight unit 5 also has a rectangular shape, and the size thereof is set accordingly to that of the liquid crystal panel 3.

Figure 3:
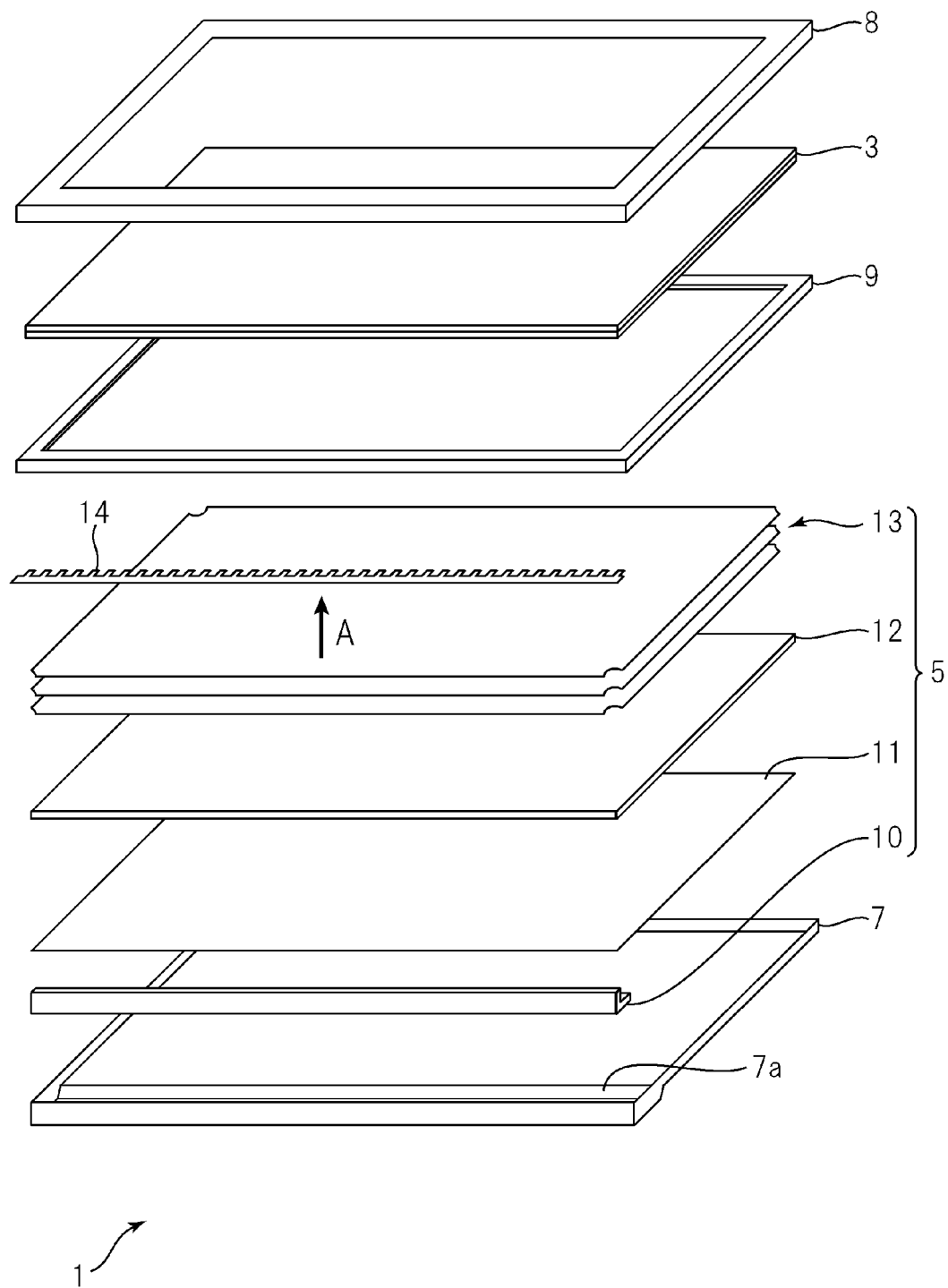
FIG. 3 is an exploded perspective view of the liquid crystal display device.

FIG. 3 is an exploded perspective view of the liquid crystal display device 1. As illustrated in FIG. 3, the liquid crystal display device 1 is structured to store the liquid crystal panel 3 and the backlight unit 5 in an outer frame formed of a lower frame 7 and an upper frame 8. An intermediate frame 9 is provided between the liquid crystal panel 3 and the backlight unit 5 so that the liquid crystal panel 3 and the backlight unit 5 are supported independently.

The backlight unit 5 includes a light emitting diode unit 10, a reflection sheet 11, a light guide plate 12, and an optical sheet 13. In the light emitting diode unit 10 of this embodiment, a substrate on which a plurality of light emitting diodes are mounted is fixed onto a radiator plate having an L-shaped cross section. The light emitting diode unit 10 is provided along one side of the liquid crystal display device 1 on the near side of FIG. 3. The plurality of light emitting diodes are disposed side by side in line in the longitudinal direction of the light emitting diode unit 10. The structure and arrangement of the light emitting diode unit 10 are described later. The lower frame 7 is provided with a recess portion 7a in a region corresponding to the light emitting diode unit 10, thereby being capable of storing the light emitting diode unit 10 therein. The reflection sheet 11 is a member for increasing light use efficiency by reflecting light emitted to the rear surface of the light guide plate 12 so as to allow the light to reenter the light guide plate 12. As the reflection sheet 11, a white reflection sheet using a PET resin or the like or a mirror finish reflection sheet may be used. The light guide plate 12 is a member for allowing the backlight unit 5 to function as a planar light source in a manner that light that has been emitted from the light emitting diode unit 10 and entered an incident surface of the light guide plate 12, which is at least one side surface thereof (in this embodiment, the surface facing the front side of FIG. 3), is caused to exit uniformly from the top face of the light guide plate 12 (in this embodiment, the surface facing the upper side of FIG. 3), that is, from an exiting surface side. The material of the light guide plate 12 is not particularly limited, but a material having high refractive index and low light transmission loss is preferred, and a resin such as polymethyl methacrylate (PMMA) may be used suitably. Further, the structure for scattering the light entering through the incident surface of the light guide plate 12 toward the exiting surface side may be any type of structure. For example, light scattering ink may be applied onto the exiting surface of the light guide plate 12 or the opposite surface thereof, or both the surfaces. Alternatively, grooves or dimples may be formed similarly. The optical sheet 13 is formed of a single or a plurality of sheets, and is an optical member for controlling an angle distribution or the like of the light emitted from the light guide plate 12. The optical sheet 13 may include a diffusion sheet and a prism sheet.

An end portion reflection sheet 14 is an elongated sheet, which is adhered to a lower side surface of the intermediate frame 9, and is a member for reflecting the light emitted from the light emitting diode unit 10 to introduce the light into an end portion of the light guide plate 12. Similarly to the reflection sheet 11, the end portion reflection sheet 14 may also be a white reflection sheet or a mirror finish reflection sheet. The arrangement and shape of the end portion reflection sheet 14 are described in detail later.

Note that, FIG. 3 omits a substrate on which the control device 2 and the like illustrated in FIG. 1 are mounted. Further, this embodiment employs the structure in which the light emitting diode unit 10 is disposed only along one side corresponding to the long side of the light guide plate 12. However, the structure is not limited thereto. The light emitting diode unit 10 may be disposed only along one side corresponding to the short side of the light guide plate 12, may be disposed along two opposing long or short sides, respectively, and may be disposed along arbitrary three sides or all the four sides.

FIG. 4 is a partial enlarged view illustrating the intermediate frame 9 and the end portion reflection sheet 14 adhered to the intermediate frame 9 as viewed from the direction A illustrated in FIG. 3. The left side of FIG. 4 corresponds to the near side of FIG. 3. The right side of FIG. 4 corresponds to the far side of FIG. 3 and is a light incident direction of the incident surface of the light guide plate 12. Further, the vertical direction of FIG. 4 corresponds to the longitudinal direction of the incident surface of the light guide plate 12. As illustrated in FIG. 4, the intermediate frame 9 includes protruding portions 9a, which are disposed side by side in the longitudinal direction of the incident surface of the light guide plate 12. The end portion reflection sheet 14 has an elongated shape extending in the longitudinal direction of the incident surface of the light guide plate 12. The edge of the end portion reflection sheet 14 on the side opposite to the light incident direction of the incident surface of the light guide plate 12 is straight, whereas the edge thereof in the light incident direction of the incident surface of the light guide plate 12 has tongue-shaped portions 14a, which are provided between adjacent protruding portions 9a and extend in the light incident direction of the incident surface.

FIG. 5 is a cross-sectional view of the liquid crystal display device 1 taken along the line B-B of FIG. 4. FIG. 5 illustrates the details of the cross-sectional shape of the intermediate frame 9 and the position of the end portion reflection sheet 14 as well as the cross-sectional shapes of the members constituting the liquid crystal display device 1 and the positional relation among the members. The details are described below.

The light emitting diode unit 10 is structured by mounting, on a radiator plate 10a, a substrate 10c on which light emitting diodes 10b are arrayed. The light emitting diode 10b is a member that is generally called a light emitting diode package, and is obtained by mounting a light emitting diode element on a substrate and sealing with a sealing resin. The light emitting diode 10b may be mounted directly on the substrate 10c. The light emitting diode 10b may include a lens for controlling a divergence range of a light beam in front of the light emitting diode element. The form of the light emitting diode 10b is not particularly limited. The substrate 10c is an elongated substrate extending in the longitudinal direction of an incident surface 12a of the light guide plate 12, and the plurality of light emitting diodes 10b are disposed on the substrate 10c in line at appropriate intervals in the same longitudinal direction. The material of the substrate 10c is not particularly limited, but in this embodiment, a material obtained by subjecting an aluminum surface to insulating coating is used in consideration of heat dissipation performance for heat generated by the light emitting diode 10b. The radiator plate 10a of this embodiment has an L-shaped cross section as illustrated in FIG. 5. The radiator plate 10a is stored and fixed into the recess portion 7a, which is formed in the lower frame 7, on a side different from the side along which the substrate 10c is mounted. A support portion 10d is formed on another side different from the side on which the substrate 10c is mounted, and is a protrusion for supporting the reflection sheet 11 and the light guide plate 12. It is preferred that the radiator plate 10a be formed of a material having high heat conductivity in order to transfer and dissipate the heat generated by the light emitting diode 10b efficiently to the lower frame 7. The suitable material is a metal such as aluminum or iron. Note that, depending on the degree of heat generation by the light emitting diode 10b, the substrate 10c and the radiator plate 10a are not always necessary to use a material having high heat conductivity.

It is preferred that the lower frame 7 and the upper frame 8 be formed of a lightweight material having high rigidity. Examples of the material that may be used for the lower frame 7 and the upper frame 8 are metals, such as a steel plate, an aluminum alloy, and a magnesium alloy, fiber reinforced plastic (FRP), and various kinds of synthetic resins. It is particularly preferred that the lower frame 7 be formed of a material having high heat conductivity in order to dissipate the heat generated from the light emitting diode 10b efficiently, which is conducted via the radiator plate 10a. In this embodiment, a steel plate is used. The material of the upper frame 8 may be the same as that of the lower frame 7 or may be different, and can be determined as appropriate considering the size, intended use, appearance, weight, and other factors of the liquid crystal display device 1. A buffer 8a is provided on the surface of the upper frame 8 facing the liquid crystal panel 3, so as to mitigate the shock occurring when the liquid crystal panel 3 swings due to vibration or the like and comes in contact with the upper frame 8. As the buffer 8a, an appropriate rubber, resin, sponge, or the like is used.

The material of the intermediate frame 9 is not particularly limited, either, but it is preferred to use a synthetic resin in terms of moldability and cost. In this embodiment, polycarbonate is used in terms of strength, but the material is not always limited thereto. As in FRP, a reinforcing material may be mixed into a synthetic resin. It is also preferred that the intermediate frame 9 have light blocking effect and therefore be in black or dark color. The coloring of the intermediate frame 9 may be attained by a black or dark color material itself or by coating the surface of the intermediate frame 9. In this embodiment, the intermediate frame 9 is obtained by molding polycarbonate that is colored in black or dark color.

The cross-section of the intermediate frame 9 is an L-shape as illustrated in FIG. 5, and the protruding portions 9a are formed, which are brought into contact with an exiting surface 12b in the vicinity of the incident surface 12a of the light guide plate 12. As illustrated in FIG. 5, the optical sheet 13 is formed so that its end portion is positioned on the light incident direction side with respect to the incident surface 12a of the light guide plate 12, and the protruding portions 9a each face the exiting surface 12b of the light guide plate 12 without the intermediation of the optical sheet 13. With this structure, the position of the light guide plate 12 in the thickness direction is determined accurately, and hence the position of the optical axis center of the light emitting diode 10b and the center of the light guide plate 12 in the thickness direction can be aligned with good accuracy. Note that, the protruding portions 9a and the exiting surface 12b are not always required to be in contact with each other, and may be provided at some gaps. In this case, the protruding portions 9a and the exiting surface 12b are brought into contact with each other when the light guide plate 12 swings due to vibration or the like.

In addition, the intermediate frame 9 has an extension portion 9b extending in the light incident direction from the protruding portions 9a. Buffers 9c and 9d are provided on both the upper and lower surfaces of the extension portion 9b, respectively. The buffer 9c supports the position of the light guide plate 12 or the optical sheet 13 when the light guide plate 12 or the optical sheet 13 swings due to vibration or the like, to thereby mitigate the shock. The buffer 9d supports the liquid crystal panel 3 and mitigates the shock due to vibration or the like. As the buffers 9c and 9d, an appropriate rubber, resin, sponge, or the like is used. Further, the buffer 8a and the buffers 9c and 9d may be provided and may not be provided. The buffers 9c and 9d may be substituted by shaping the intermediate frame 9.

A bonding surface 9e used for adhering the end portion reflection sheet 14 is formed beside the protruding portions 9a of the intermediate frame 9, and the end portion reflection sheet 14 is adhered onto the bonding surface 9e.

The end portion reflection sheet 14 is adhered onto the bonding surface 9e of the intermediate frame 9, and is disposed closer to the exiting surface 12b of the light guide plate 12 with respect to the light emitting diode 10b. The end portion reflection sheet 14 is shaped to extend in the longitudinal direction of the incident surface 12a of the light guide plate 12 as described above and therefore covers the exiting surface 12b side of all the light emitting diodes 10b disposed in line in the same longitudinal direction.

The light guide plate 12 is disposed so as to have a slight gap, in this embodiment a gap of approximately 1 mm, between the incident surface 12a thereof and the light emitting diodes 10b. The light guide plate 12 expands and contracts depending on environments including temperature and humidity and changes its dimensions, and hence the gap is provided in order to prevent breakage occurring when the incident surface 12a and the light emitting diode 10b are brought into contact with each other. Note that, specific dimensions of the gap are designed as appropriate depending on the size of the light guide plate 12, its possible use environments, and the like. On the other hand, the end portions of the reflection sheet 11 and the end portion reflection sheet 14 are disposed so as to protrude toward the light emitting diode 10b side with respect to the incident surface 12a. With this, light which has been emitted from the light emitting diode 10b in the upward or downward direction of FIG. 5 (light which has not traveled toward the incident surface 12a of the light guide plate 12) is reflected to enter the incident surface 12a of the light guide plate 12. Accordingly, light leakage from the light emitting diodes 10b is prevented, to thereby increase light use efficiency.

Now, the difference in action between the case where mirror finish reflection sheets are used for the reflection sheet 11 and the end portion reflection sheet 14 and the case where white reflection sheets (i.e., scattering reflection sheets) are used therefor is described.

In the case where a mirror finish reflection sheet is used for the reflection sheet 11 or the end portion reflection sheet 14, a component of reflected light in the light incident direction (optical axis direction of the light emitting diode 10b) is always constant regardless of the presence or absence of reflection, and hence light beams that have been reflected on the light emitting diode 10b side with respect to the incident surface 12a of the light guide plate 12 enter the incident surface 12a efficiently. On the other hand, light beams that have been reflected on the light incident direction side with respect to the incident surface 12a of the light guide plate 12, for example, light beams that have been reflected after entering the gap between the exiting surface 12b of the light guide plate 12 and the end portion reflection sheet 14 enter the light guide plate 12 through the exiting surface 12b, and hence a major part of the reflected light beams is lost as stray light, or exits from an end portion of an effective display region for displaying an image because the light beams are not guided inside the light guide plate, with the result that bright unevenness may occur.

On the contrary, in the case where a white reflection sheet is used for the reflection sheet 11 or the end portion reflection sheet 14, the obtained reflected light is scattered light, and hence the reflected light does not always travel toward the incident surface 12a of the light guide plate 12 and a loss occurs. On the other hand, in the case where light beams that have been reflected on the light incident direction side with respect to the incident surface 12a of the light guide plate 12 travel toward the light emitting diode 10b and are then scattered, the light beams may be reflected on the surface of the substrate 10c and the like and enter the incident surface 12a.

Besides, generally, the white reflection sheet has light beam reflectance of approximately 96% or more, which is higher than that of the mirror finish reflection sheet.

Therefore, which of the mirror finish reflection sheet or the white reflection sheet is to be used for the reflection sheet 11 and the end portion reflection sheet 14 can be determined depending on the advantages and disadvantages in consideration of the above-mentioned circumstances.

Further, the height of the protruding portion 9a of the intermediate frame 9, that is, the distance from the bonding surface 9e to the distal end of the protruding portion 9a is equal to or larger than the thickness of the end portion reflection sheet 14. With this, the exiting surface 12b of the light guide plate 12 does not contact the end portion reflection sheet 14. If the end portion reflection sheet 14 contacts the exiting surface 12b or is in close contact thereto, the total reflection condition in the light guide plate 12 is not established, and light leakage or a loss may be caused. However, as the reflection surface of the end portion reflection sheet 14 is closer to the light guide plate 12, the intensity of light that enters the gap between the end portion reflection sheet 14 and the light guide plate 12 reduces more while the intensity of light that enters the light guide plate 12 increases more. It is therefore more desired that the distance from the bonding surface 9e to the distal end of the protruding portion 9a be equal to the thickness of the end portion reflection sheet 14 or slightly larger than the thickness of the end portion reflection sheet 14 (by 0.1 mm or less).

By the way, in recent years, there has been a strong demand for narrowing the width of a frame in a liquid crystal display device (so-called narrow framing). In other words referring to FIG. 5, it is necessary to reduce the distance from the light emitting diode 10b to a region that does not function as an effective display region of the liquid crystal display device 1, that is, the distance from the light emitting diode 10b to the distal end of the extension portion 9b. In consideration of strength and dimensional tolerance of each member, however, the lengths of the protruding portion 9a and the buffer 9c as well as the extension portion 9b cannot be changed. As a countermeasure, if the width of the bonding surface 9e is narrowed to, for example, 1 mm or less, a margin to adhere the end portion reflection sheet 14 becomes insufficient and the end portion reflection sheet 14 cannot be fixed in a stable manner. To address the problem, in this embodiment, as illustrated in FIG. 4, the protruding portions 9a are disposed side by side intermittently in the longitudinal direction of the incident surface 12a of the light guide plate 12, and the tongue-shaped portions 14a of the end portion reflection sheet 14 are interposed and adhered between adjacent ones of the protruding portions 9a. This structure enlarges the margin to adhere the end portion reflection sheet 14, that is, the bonding area, thus providing stable fixation.

FIG. 6 is a cross-sectional view of the liquid crystal display device 1 taken along the line C-C of FIG. 4, illustrating how the tongue-shaped portion 14a is adhered to the intermediate frame 9

Note that, FIG. 4 illustrates the protruding portions 9a whose planar shape is oval, but the shape is not limited thereto and any shape may be employed. The tongue-shaped portion 14a is shaped to protrude like a rectangle, but the shape is not limited thereto, either, and any shape may be employed. In the case where stable fixation of the end portion reflection sheet 14 is attained by the fixation by the tongue-shaped portions 14a alone, the bonding surface 9e may be omitted. In this embodiment, the tongue-shaped portions 14a are adhered for every gap between the protruding portions 9a. This form is preferred because the largest bonding area can be obtained.

However, the present invention is not limited to this form, and the number and arrangement of the tongue-shaped portions 14a may be determined as appropriate.

By the way, in this embodiment, the protruding portions 9a are provided on the light incident direction side with respect to the incident surface 12a illustrated in FIG. 5. In other words, the position of the end portion of the protruding portion 9a on the light emitting diode 10b side is on the light incident direction side with respect to the incident surface 12a. The reason of this arrangement is as follows. As described above, the intermediate frame 9 is in black or dark color and has properties of absorbing light beams, and hence if the protruding portions 9a are positioned on the light emitting diode 10b side with respect to the incident surface 12a, the difference in light intensity of light that is reflected by the end portion reflection sheet 14 to enter the incident surface 12a occurs between the region in which the protruding portion 9a is provided (see FIG. 5) and the region in which the protruding portion 9a is not provided (see FIG. 6), with the result that brightness unevenness occurs.

FIG. 7 is a view illustrating a positional relation among the intermediate frame 9, the light guide plate 12, and the optical sheet 13 of the liquid crystal display device 1 in plan view. FIG. 7 is viewed from the exiting surface side of the light guide plate 12. The intermediate frame 9 is illustrated as broken lines for convenience of illustration, and members behind the intermediate frame 9 are seen therethrough. In FIG. 7, the incident surface 12a of the light guide plate 12 is illustrated as the lower side.

At positions corresponding to the four corners of the light guide plate 12, second protruding portions 9f are illustrated, which are provided on the surface of the intermediate frame 9 on the light guide plate 12 side and are adapted to contact the light guide plate 12 to support the light guide plate 12. The second protruding portions 9f are each larger in size than the protruding portions 9a (see FIGS. 4 and 5) in plan view. The protruding portions 9a have a narrow width for narrow framing described above, and hence the support of the light guide plate 12 is insufficient. The second protruding portions 9f are provided for compensating for the insufficient support. Further, the optical sheet 13 has cutouts 13a formed therein corresponding to the second protruding portions 9f, and is prevented from being interposed between the second protruding portions 9f and the light guide plate 12.

Subsequently, a second embodiment of the present invention is described. This embodiment is the same as the above-mentioned first embodiment, except for the structure in the vicinity of the protruding portions 9a of the intermediate frame 9. Therefore, FIGS. 1 to 3, 5, and 7 illustrating the liquid crystal display device 1 according to the first embodiment are common to a liquid crystal display device 101 according to this embodiment, and hence the following description refers to FIGS. 1 to 3, 5, and 7 as the figures illustrating the liquid crystal display device 101 according to this embodiment. Further, common members are denoted by the same reference symbols, and overlapping description is omitted.

FIG. 8 is a partial enlarged view illustrating an intermediate frame 9 and an end portion reflection sheet 14 adhered to the intermediate frame 9 as viewed in the direction A illustrated in FIG. 3 in the liquid crystal display device 101 according to this embodiment. As illustrated in FIG. 8, in this embodiment, as compared to the first embodiment (see FIG. 4), the length of each tongue-shaped portion 14a of the end portion reflection sheet 14 in the light incident direction is slightly shorter, and shielding portions 9g are each provided between adjacent protruding portions 9a of the intermediate frame 9 in a region on the light incident direction side. More specifically, the shielding portions 9g are each disposed so as to connect end portions of the adjacent protruding portions 9a on the light incident direction side to each other.

The cross section of the liquid crystal display device 101 taken along the line B-B of FIG. 8 is exactly the same as that of the liquid crystal display device 1 according to the first embodiment, which is illustrated in FIG. 5. On the other hand, FIG. 9 is a cross-sectional view of the liquid crystal display device 101 taken along the line C-C of FIG. 8.

As illustrated in FIG. 9, in a region closer to the light incident direction side with respect to the tongue-shaped portion 14a of the end portion reflection sheet 14, the shielding portion 9g protrudes toward the exiting surface 12b of the light guide plate 12. At the position between the protruding portions 9a (i.e., the position illustrated in FIG. 9), the shielding portion 9g shields light that has been emitted from the light emitting diode 10b to enter between the end portion reflection sheet 14 and the exiting surface 12b, to thereby prevent the light from leaking out to the optical sheet 13 side. In other words, the liquid crystal display device 101 according to this embodiment suppresses brightness unevenness occurring by the light that leaks out from the gap between the protruding portions 9a in the structure in which the protruding portions 9a are disposed intermittently.

Note that, this embodiment has exemplified the shielding portion 9g, which is formed integrally with the intermediate frame 9, but the shielding portion 9g is not limited thereto. Alternatively, for example, in the liquid crystal display device 1 illustrated in the first embodiment, the shielding portion 9g may be formed by adhering an appropriate shielding member between adjacent protruding portions 9a or adhering a light shielding sheet on the surface of the protruding portion 9a on the optical sheet 13 side.

Subsequently, a third embodiment of the present invention is described. This embodiment is the same as the above-mentioned first embodiment, except for the structure of the extension portion 9b of the intermediate frame 9. Therefore, FIGS. 1 to 4 illustrating the liquid crystal display device 1 according to the first embodiment are common to a liquid crystal display device 201 according to this embodiment, and hence the following description refers to FIGS. 1 to 4 as the figures illustrating the liquid crystal display device 201 according to this embodiment. Further, common members are denoted by the same reference symbols, and overlapping description thereof is omitted.

FIG. 10 is a cross-sectional view of the liquid crystal display device 201 taken along the line B-B of FIG. 4. As illustrated in FIG. 10, no buffer is provided to the extension portion 9b of the intermediate frame 9, and as an alternative thereto, support portions 9h protruding to both sides of the extension portion 9b are provided. In this embodiment, the liquid crystal panel 3 and the backlight unit 5 (see FIG. 3) are supported by the support portions 9h, and the shock due to vibration or the like is mitigated by elastic distortion of the extension portion 9b itself and is then absorbed. It is therefore preferred that the extension portion 9b be narrowed in the middle as illustrated in FIG. 10 and have such a cross section that is easily elastically deformed. A buffer may be used for any one of the support portions 9h.

Note that, each of the embodiments described above is a specific example for describing the present invention, and the present invention is not intended to be limited to the each of the embodiments. For example, it should be understood that the shape of each member, including the cross section, illustrated in the drawings in the each of the embodiments described above is designed or optimized as appropriate and necessary as long as the intended functions of the member are satisfied.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
   a liquid crystal panel;
   a backlight unit comprising a light guide plate and light emitting diodes, the light emitting diodes being opposed to an incident surface of the light guide plate, which is at least one side surface of the light guide plate, and being disposed side by side in a longitudinal direction of the incident surface;
   an intermediate frame, which comprises a plurality of protruding portions that protrude to an exiting surface side of the light guide plate, and is disposed between the liquid crystal panel and the backlight unit; and
   an end portion reflection sheet, which is disposed on an exiting surface side of the intermediate frame and adjacent to the plurality of protruding portions, extends in an array direction of the light emitting diodes, and comprises tongue-shaped portions each extending between adjacent ones of the plurality of protruding portions.

2. The liquid crystal display device according to claim 1, wherein the plurality of protruding portions are arrayed intermittently along the array direction of the light emitting diodes, and are provided on a light incident direction side of the incident surface with respect to the incident surface of the light guide plate.

3. The liquid crystal display device according to claim 1, further comprising shielding portions for shielding light, each of which is disposed between the adjacent ones of the plurality of protruding portions in a region on a light incident direction side of the incident surface.

4. The liquid crystal display device according to claim 1, wherein the intermediate frame further comprises second protruding portions, which are adapted to contact the light guide plate at positions corresponding to four corners of the light guide plate, the second protruding portions being larger in size than the plurality of protruding portions.

5. The liquid crystal display device according to claim 1, wherein the end portion reflection sheet further comprises a portion extending out of the intermediate frame in a direction opposite to a light incident direction of the incident surface.

* * * * *